United States Patent
Naesje

(10) Patent No.: US 7,431,047 B2
(45) Date of Patent: Oct. 7, 2008

(54) DEVICE FOR UNDERPRESSURE-ACTIVATED DISPENSING OF FLUIDS

(75) Inventor: Kjetil Naesje, Sandnes (NO)

(73) Assignee: SmartSeal AS (NO)

(*) Notice: Subject to any disclaimer, the term of this patent is extended or adjusted under 35 U.S.C. 154(b) by 255 days.

(21) Appl. No.: 10/568,326

(22) PCT Filed: Aug. 13, 2004

(86) PCT No.: PCT/NO2004/000245

§ 371 (c)(1),
(2), (4) Date: Feb. 16, 2006

(87) PCT Pub. No.: WO2005/016084

PCT Pub. Date: Feb. 24, 2005

(65) Prior Publication Data

US 2006/0191575 A1   Aug. 31, 2006

(30) Foreign Application Priority Data

Aug. 18, 2003   (NO) ................... 20033657

(51) Int. Cl.
*F16K 1/00* (2006.01)
*F16K 31/126* (2006.01)

(52) U.S. Cl. .............. 137/494; 137/907; 220/714; 239/33

(58) Field of Classification Search ........... 137/494 I, 137/907 X; 239/32, 33; 220/714 X
See application file for complete search history.

(56) References Cited

U.S. PATENT DOCUMENTS

| | | | |
|---|---|---|---|
| 3,705,601 A | | 12/1972 | Arisland |
| 4,135,513 A | * | 1/1979 | Arisland ............ 137/494 |
| 4,850,533 A | | 7/1989 | Hoshi et al. |
| 4,971,048 A | | 11/1990 | Seekins |
| 5,653,251 A | * | 8/1997 | Handler ............ 137/907 |
| 6,290,090 B1 | * | 9/2001 | Essebaggers ........ 220/714 |
| 2002/0189683 A1 | | 12/2002 | Danby et al. |
| 2003/0029503 A1 | | 2/2003 | Williamson et al. |
| 2003/0071136 A1 | | 4/2003 | Ference |

FOREIGN PATENT DOCUMENTS

NO   315511   6/2003

OTHER PUBLICATIONS

International Search Report mailed Dec. 22, 2004.
Written Opinion of ISA mailed Dec. 22, 2004.
Applicant's Reply and Amended Claims dated Jun. 17, 2005.

* cited by examiner

*Primary Examiner*—Stephen M Hepperle
(74) *Attorney, Agent, or Firm*—Andrus, Sceales, Starke & Sawall, LLP

(57) ABSTRACT

The present invention regards an underpressure-activated valve mechanism for controlled dispensing of fluids, including liquid food articles, from a receptacle. When the user applies sufficient suction force (P2) across a pressure comparative diaphragm zone a valve opening force is applied to a valve area that has a force connection with the diaphragm zone. When the suction force ceases the valve area closes and remains closed, even in the event of overpressure (P3) in the receptacle.

14 Claims, 3 Drawing Sheets

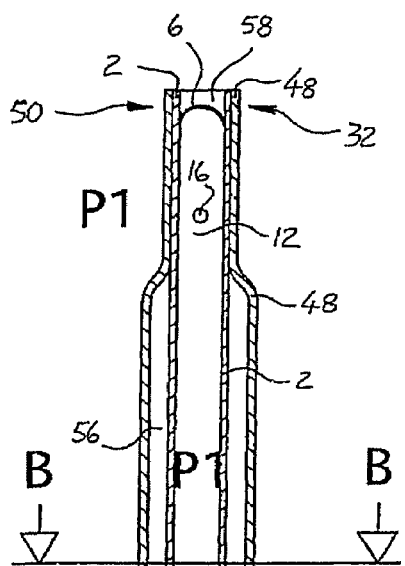
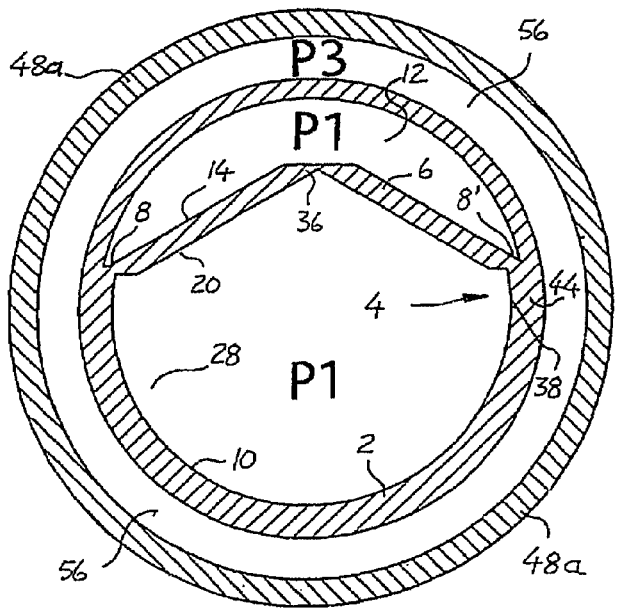
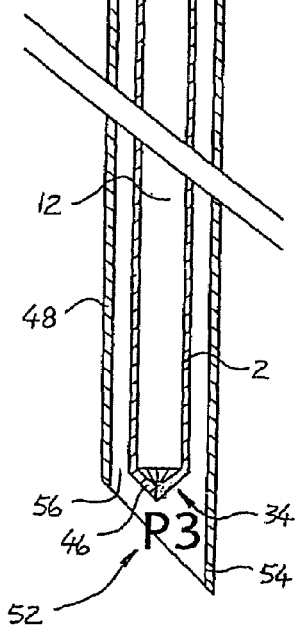
Fig. 3a
Fig. 3b
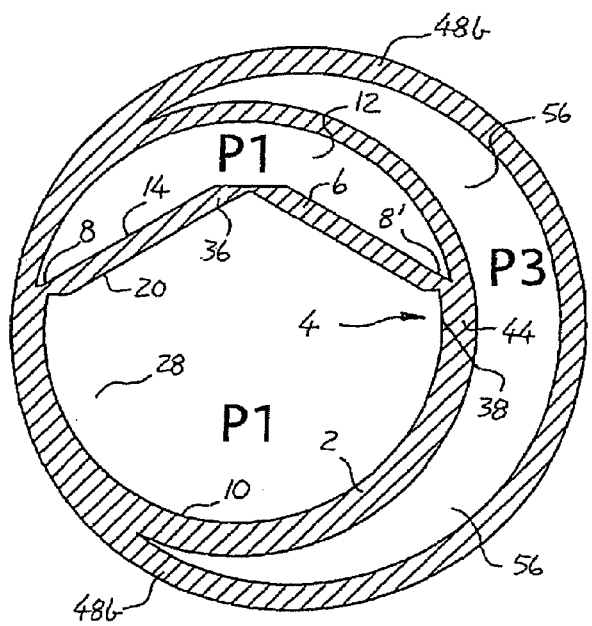
Fig. 3c

US 7,431,047 B2

DEVICE FOR UNDERPRESSURE-ACTIVATED DISPENSING OF FLUIDS

CROSS-REFERENCE TO RELATED APPLICATIONS

This application is the U.S. national stage application of International Application PCT/NO2004/000245, filed Aug. 13, 2004, which International Application was published on Feb. 24, 2005, as International Publication No. WO 2005/016084 A1 in the English language. The International Application claims priority of Norwegian Patent Application 20033657, filed Aug. 18, 2003.

BACKGROUND OF THE INVENTION

The present invention concerns a device for an underpressure-activated dispensing valve in a pipe, for example a drinking straw. In its position of use, the pipe is intended for connection to a receptacle containing a fluid, for example a liquid food article, at a pressure $P3$. The pressure $P3$ in the receptacle may constitute an overpressure relative to the ambient pressure $P1$ of the receptacle and the pipe, for example atmospheric pressure or another pressure reference. The fluid and the receptacle, however, do not have to be overpressured relative to $P1$. The purpose of the present valve device is, among other things, to prevent unintended fluid outflow from the receptacle. For example, the receptacle may be shaped as a rigid drinking receptacle or a soft drinking bag.

Fluid outflow from the receptacle may be initiated by, for example, a person sucking in one end of the pipe, thus supplying the dispensing valve with a valve-activating and valve-opening underpressure $P2$ relative to said ambient pressure $P1$.

A similar valve device and associated method is disclosed in Norwegian patent application no. 20015957. The device according to this patent application comprises, among other things, an outer casing and an inner pipe being movable relative to each other. The inner pipe may be deformable or connected to a bellows. When the inner pipe is supplied an underpressure $P2$, it is moved relative to the outer casing, thereby allowing an outlet opening in the valve to open to fluid outflow from a drinking receptacle connected thereto. When the underpressure $P2$ ceases, the valve will close the outlet opening automatically, even at an overpressure $P3$ in the receptacle.

In some other known valve devices, opening and closing of the valve is carried out through manual and mechanical movement of the sealing element of the valve, Many such valves will open automatically at an overpressure $P3$ in the receptacle to which the valve is connected, which may cause unintended fluid outflow and spill. Therefore, such valves are used essentially for non-pressurized fluids, for example water.

Moreover, many of the known valve devices have a complex shape and manner of operation, and thus they may be relatively expensive to manufacture.

SUMMARY OF THE INVENTION

The object of the present invention is to prevent or remedy disadvantages of prior art. The object is achieved by means of features disclosed in the following description and in the subsequent claims.

The present invention concerns a device for a dispensing valve in a pipe. In its position of use, the pipe is connected to a receptacle containing a fluid at a pressure $P3$. Similar to valves in general, the present valve also comprises the following valve elements:

an activating element;
a sealing element which is force-transmittingly connected to the activating element; and
a valve seat against which the sealing element seals when the valve is inactive and in its position of rest. The pipe is open at least in a first end and contains at least:
a separate pressure balancing channel communicating only with the ambient pressure $P1$ of the pipe;
a suction channel communicating with the first end of the pipe and with the valve, and which is closed at a second end of the pipe; and
said activating element in the form of a flexible membrane attached internally in the pipe, and which separates the pressure balancing channel from the suction channel. The valve is arranged to open to fluid outflow when the suction channel, via the first end of the pipe, is supplied an underpressure $P2$ which is less than said ambient pressure $P1$ by a predetermined value, whereby the membrane 6 is exposed to a pressure difference ($P1-P2$) which activates and moves the membrane, thereby transmitting a valve-opening force to the sealing element.

The distinctive characteristic of the present valve device is that the membrane, the sealing element and its valve seat have a lengthy shape and extend in the longitudinal direction of the pipe; and
wherein the opposite long sides of the membrane are attached to the inside of the pipe and at a distance from each other.

The pipe according to the invention may be circular in cross-section, but it may also have other suitable spatial shapes. For example, the pipe and the valve device may spiral in the longitudinal direction, thereby providing them with greater strength and ability to resist damage when influenced by external forces.

Advantageously, the pipe and its internal valve elements may be formed from various materials and/or material combinations, preferably from plastics materials. For physical protection, it may be advantageous to use a relatively rigid material and/or a relatively rigid construction externally, whereas softer materials may be used to a larger extent for internal valve elements. This particularly concerns areas in which the valve's sealing element and valve seat engage in order to ensure reliable closing of the valve. Choices of suitable materials, however, are considered obvious to a person skilled in the art.

The pipe with the internal valve according to the invention implies, among other things, the advantage that it may be extruded in one part without using particularly advanced technology.

In one embodiment, the lengthy sealing element may be force-transmittingly connected to the lengthy membrane via a lengthy and axially extending first valve rib attached to the membrane and projecting outward therefrom;
wherein the lengthy valve seat communicates with the pipe via a lengthy and axially extending second valve rib attached to the inside of the pipe and projecting outward therefrom;
whereby an internal fluid outflow channel, which is open at the second end of the pipe, is defined between the membrane, the inside of the pipe and said two valve ribs. This embodiment implies the advantage of the pipe forming a continuous and protective jacket around the valve elements in the internal dispensing valve.

In another embodiment, the second end of the pipe may be closed, whereby the suction channel also is closed at this end; wherein the wall of the pipe is provided with an axially extending and through-going slit arranged vis-à-vis the suction channel, in which one slit surface of the slit constitutes the lengthy sealing element, whereas the other slit surface of the slit constitutes the lengthy valve seat; and wherein the sealing element and the lengthy membrane are force-transmittingly connected via an intermediate wall portion of the pipe;

whereby said two slit surfaces will move away from each other and open to fluid outflow when the suction channel is supplied said valve-opening underpressure P2. This other embodiment implies the advantage that the pipe and its dispensing valve constitute a very simple form of construction, which is easy to mass-produce.

In the latter embodiment, at least a longitudinal portion and perimeter portion of the pipe may also be enclosed by an outer tubular mantle, said portions including said dispensing valve;

wherein a first end of the mantle is attached sealingly against the pipe in a region between the first end of the pipe and its dispensing valve, whereas a second end of the mantle is open;

whereby an external fluid outflow channel is defined between the pipe and the outer mantle. Similar to the pipe containing the dispensing valve, the mantle may have any suitable cross-sectional shape and profile with associated, unlimited embodiment possibilities.

The outer tubular mantle may be comprised of a separate outer pipe. The separate outer pipe may also be telescopically arranged, whereby the outer pipe is extensible and contractible in its longitudinal direction.

As an alternative, the outer tubular mantle may be incorporated together with a longitudinal portion of the pipe containing the dispensing valve.

The second, open end of the mantle may be shaped as a point, whereby the second end of the mantle may be readily inserted into said fluid receptacle.

The second end of the pipe containing the dispensing valve may also be shaped as a point, whereby the pipe may be readily inserted into said fluid receptacle. This is particularly useful if the pipe is to be used as a drinking straw and is stabbed through the wall of an associated drinking receptacle.

Furthermore, said pressure balancing channel may be connected to at least one vent communicating with the ambient pressure P1 of the pipe 2.

BRIEF DESCRIPTION OF THE DRAWINGS

Hereinafter, four non-limiting examples of embodiments of the device according to the invention are described with reference to the following drawings, in which:

FIG. 3a shows a longitudinal section through a pipe containing a valve device according to the invention, in which a tubular mantle encloses the pipe, the figure also showing a section line B-B through the pipe and the mantle;

FIG. 3b shows a cross-section along section line B-B shown in FIG. 3a, the figure showing a third embodiment of the present valve in an inactive and closed state, in which said mantle is comprised of a separate outer pipe; and FIG. 3c also shows a cross-section along section line B-B shown in FIG. 3a, the figure showing a fourth embodiment of the present valve in an inactive and closed state, in which said mantle is incorporated together with a portion of the pipe.

The figures are schematic and may therefore be somewhat distorted with respect to sizes and relative positions of details shown in the figures. Similar reference numerals are substantially used for similar or corresponding details in the various examples of embodiments of the invention.

DETAILED DESCRIPTION OF THE DRAWINGS

Figure 1A:
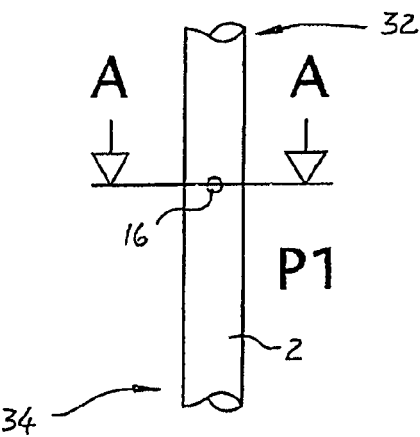
FIG. 1a shows a front view of a longitudinal portion of a pipe containing a valve device according to the invention, the figure also showing a section line A-A through the pipe.
Figure 1B:
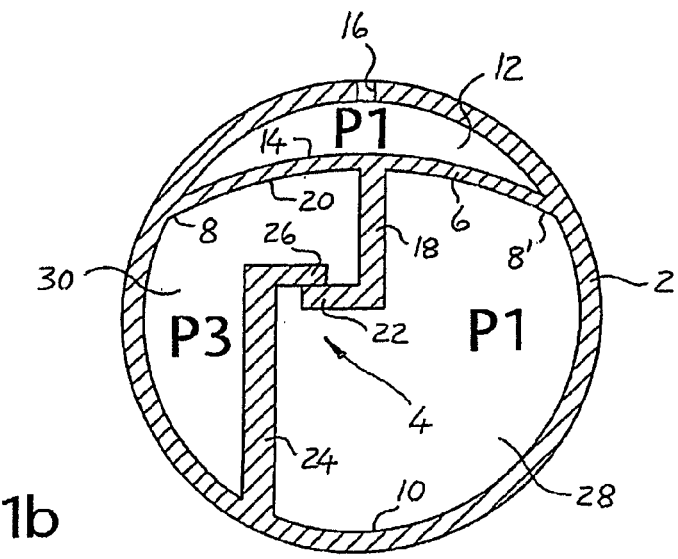
FIG. 1b shows a cross-section along section line A-A shown in FIG. 1a, in which the figure shows a first embodiment of the present valve in an inactive and closed state.
Figure 1C:
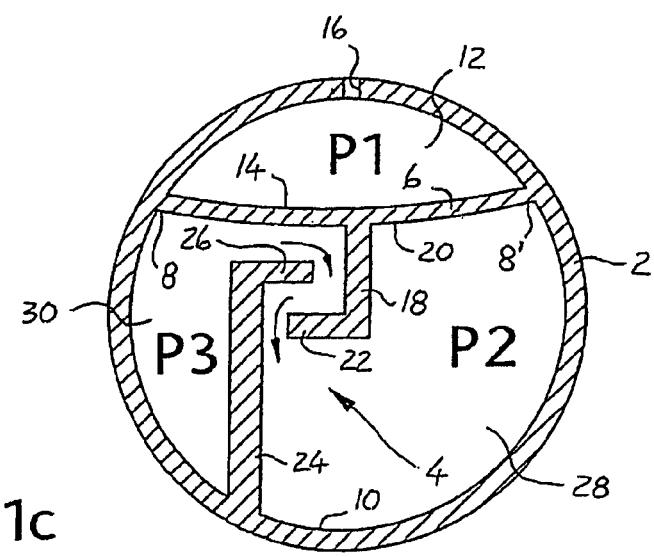
FIG. 1c shows the cross-section according to FIG. 1b, but in this figure the valve is shown in an active and open state.

FIGS. 1a-1c show a first embodiment of a pipe 2, for example a drinking straw in a plastics material, provided with an internal valve 4 according to the invention. In FIGS. 1b and 1c, the valve 4 is shown in a closed and an open state, respectively. Downstream-directed arrows in FIG. 1c indicate the outflow direction. The valve 4 consists of a flexible membrane 6, a sealing element and a valve seat, these components preferably being formed from plastics materials. According to the invention, all of these constructional elements have a lengthy shape and extend in the longitudinal direction of the pipe 2. The opposite long sides 8, 8' of the membrane 6 are attached to the inside 10 of the pipe 2 and at a distance from each other. A separate pressure balancing channel 12 thus exists between the pipe 2 and one side 14 of the membrane 6. The pressure balancing channel 12 communicates only with the ambient pressure P1 of the pipe 2 via at least one vent 16.

A lengthy and axially extending first valve rib 18 is attached approximately midway on the other side 20 of the membrane 6 and projects outward therefrom. At its free end, the valve rib 18 is provided with a transverse sealing element 22 with a sealing surface facing the other side 20 of the membrane 6. In this embodiment, the sealing element 22 and said valve rib 18 form an L-shaped and relatively rigid valve element. Thereby, the sealing element 22 is force-transmittingly connected to the membrane 6.

In addition, a lengthy and axially extending second valve rib 24 is attached to the inside 10 of the pipe 2 and projects outward therefrom toward the sealing element 22. At its free end, the valve rib 24 is provided with a transverse valve seat 26 facing the sealing surface of the sealing element 22, and being capable of cooperating with this surface in order to open or close the valve 4. The valve seat 26 and the second valve rib 24 form an L-shaped and relatively rigid valve element, which is force-transmittingly connected to the pipe 2. FIG. 1b shows the valve seat 26 and the sealing element 22 placed sealingly against each other when the valve 4 is inactive and in its position of rest, in which position the membrane 6 is provided with a certain bias. FIG. 1c shows the valve 4 in its active and open position of use.

Between the other side 20 of the membrane 6 and the pipe 2, the first and second valve ribs 18, 24 thus define a suction channel 28 and a fluid outflow channel 30. The suction channel 28 communicates with an open first end 32 of the pipe 2, whereas the outflow channel 30 is open at a second end 34 of the pipe 2. When the pipe 2 is connected to a fluid receptacle (not shown) with a pressure P3, for example an overpressure, the outflow channel 30 also has a pressure P3, as shown in FIGS. 1b and 1c. The pressure balancing channel 12, however, is provided separate from the suction channel 28 and the outflow channel 30, for example by using welding or gluing to fix the membrane 6 to the pipe 2 in vicinity of its first and second ends 32, 34. The valve 4 is opened to outflow when the suction channel 28 is supplied an underpressure P2 via the first end 32 of the pipe 2, as shown in FIG. 1c. When the underpressure P2 in the suction channel 28 ceases and is replaced by the ambient pressure P1, the flexible membrane 6 will move back automatically to its position of rest due to said bias in the membrane 6, as shown in FIG. 1b.

Figure 2A:
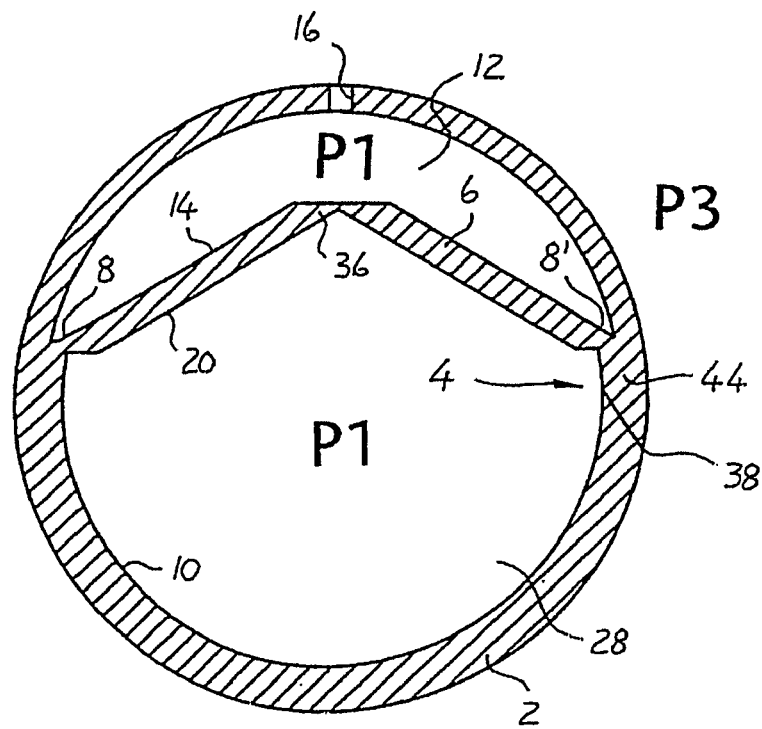
FIG. 2a shows a cross-section along section line A-A shown in FIG. 1a, in which the figure shows a second embodiment of the present valve in an inactive and closed state.
Figure 2B:
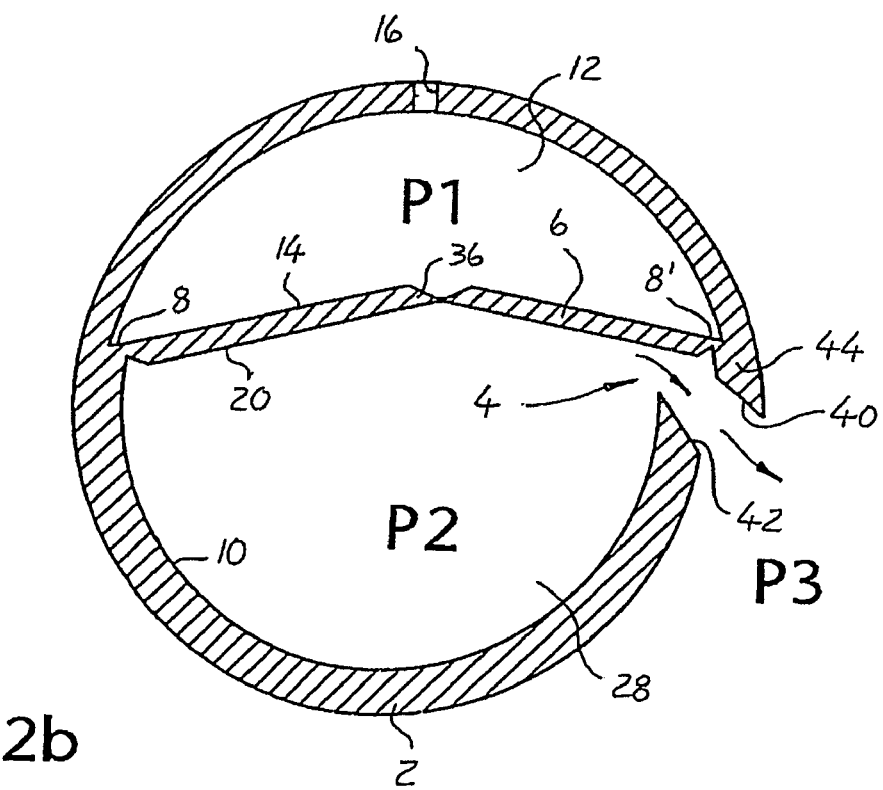
FIG. 2b shows the cross-section according to FIG. 2a, but in this figure the valve is shown in an active and open state.

FIGS. 2a and 2b show a second embodiment of a pipe 2, for example a drinking straw, provided with a valve 4 according to the invention, insofar as both the pipe 2 and the valve 4 preferably are formed from plastics materials. The figures show the pipe 2 in the state it will exist after being inserted into a fluid receptacle (not shown) with a pressure P3, for example an overpressure. Contrary to the preceding examples of embodiments, the pipe 2 does not contain an outflow channel 30, but only a pressure balancing channel 12 and a suction channel 28. Also this pressure balancing channel 12 is provided with at least one vent 16 communicating only with the ambient pressure P1. The second end 34 of the pipe 2 is closed, whereby the suction channel 28 also is closed at this end. The pressure balancing channel 12 is provided separate from the suction channel 28, for example by using welding or gluing to fix the membrane 6 to the pipe 2 in vicinity of its first and second ends 32, 34. In FIGS. 2a and 2b, the valve 2 is shown in a closed and an open state, respectively. Downstream-directed arrows in FIG. 2b indicate the outflow direction.

Similar to the first example of an embodiment, the valve 4 consists of a flexible membrane 6, a sealing element and a valve seat, all of which extend in the longitudinal direction of the pipe 2. Also this membrane 6 is provided with a certain bias when in its position of rest. Additionally, the membrane 6 is provided with a thin flexure zone 36 extending in the longitudinal direction of the pipe 2, and yielding upon movement of the membrane 6. According to the invention, the opposite long sides 8, 8' of the membrane 6 are attached to the inside 10 of the pipe 2 and at a distance from each other.

In this example, the wall of the pipe 2 is provided with an axially extending and through-going slit 38 arranged vis-à-vis the suction channel 28. One slit surface 40 of the slit 38 constitutes the lengthy sealing element of the valve 4, whereas the other slit surface 42 of the slit 38 constitutes the lengthy valve seat of the valve 4. The slit 38 is arranged obliquely through the wall of the pipe 2. Thereby, a potential overpressure P3 at the outside of the pipe 2 will force the slit surfaces 40, 42 tighter together and close the valve 4 better than that of an atmospheric pressure P3 outside the pipe 2.

The lengthy membrane 6 and the one slit surface 40, which constitutes the sealing element of the valve 4, are force-transmittingly connected via an intermediate wall portion 44 of the pipe 2. When the suction channel 28 is supplied said underpressure P2 via the first end 32 of the pipe 2, the two slit surfaces 40, 42 will move away from each other and open the valve 4 to fluid outflow, as shown in FIG. 2b. When the underpressure P2 in the suction channel 28 ceases and is replaced by the ambient pressure P1, the flexible membrane 6 will move back automatically to its position of rest due to said bias in the membrane 6, as shown in FIG. 2a. Advantageously, the second end 34 of the pipe 2 may be shaped as a closed point 46, whereby the pipe 2 may be readily inserted through and into said fluid receptacle.

FIG. 3a shows a longitudinal section through a further pipe 2, for example a drinking straw, provided with a valve 4 arranged according to the second embodiment of the invention. This longitudinal section shows the internal pressure balancing channel 12 of pipe 2. Herein, the second end 34 of the pipe 2 is shaped as a closed point 46. Moreover, a longitudinal portion and a perimeter portion of the pipe 2 are enclosed by an outer tubular mantle 48 made from a plastics material, said longitudinal portion and perimeter portion including the valve 4. A first end 50 of the mantle 48 is attached sealingly against the pipe 2 in a region between its first end 32 and its valve 4, whereas a second end 52 of the mantle 48 is open and shaped as a point 54 extending a little past the closed point 46 of the pipe 2. Thus, a fluid outflow channel 56 is defined between the pipe 2 and the mantle 48. After having stabbed the pipe 2 and the mantle 48 through and into said fluid receptacle having a pressure P3, the pressure P3 also will exist in the fluid outflow channel 56. FIG. 3a also shows a vent 16 into the pressure balancing channel 12 via the mantle 48 and the pipe 2. The vent 16 is arranged between the first end 50 of the mantle 48 and said longitudinal portion/perimeter portion of the pipe 2, which includes the valve 4. The figure also shows a region 58 at the first, open end 32 of the pipe 2, in which the membrane is fixed through welding to the inside 10 of the pipe 2, and in which the figure also shows a section through the membrane 6 in proximity of this region 58. In its opposite end, the membrane 6 is fixed through welding to the pipe 2 at its closed point 46. Thereby, the pressure balancing channel 12 is arranged separate from the suction channel 28 of the pipe 2.

FIG. 3b shows a third embodiment according to the invention, in which the outer tubular mantle is comprised of a separate outer pipe 48a. Thus, said fluid outflow channel 56 constitutes a peripherally continuous annulus.

FIG. 3c shows a fourth embodiment, in which an outer tubular mantle 48b is incorporated together with a portion of the pipe 2. Thus, said fluid outflow channel 56 constitutes a peripherally discontinuous annulus.

The valve designs according to these examples of embodiments provide the favourable result of closing the valve 4 even tighter when the pressure P3 in the receptacle is overpressured, for example when the receptacle contains a fizzy soft drink or similar, which prevents unintended outflow and spill. This is a substantial difference from known valve devices which are opened and closed through manual and mechanical movement of the valve's sealing element, and which will open automatically when an overpressure P3 exists in a receptacle connected thereto.

The invention claimed is:

1. A device for a dispensing valve in a pipe, the pipe being connected, when in its position of use, to a receptacle containing a fluid at a pressure (P3), in which the valve comprises:
   an activating element;
   a sealing element which is force-transmittingly connected to the activating element; and
   a valve seat against which the sealing element seals when the valve is inactive and in its position of rest;
   in which the pipe at least is open in a first end and contains at least:
   a separate pressure balancing channel communicating only with the ambient pressure (P1) of the pipe;
   a suction channel communicating with the first end of the pipe and with the valve, and which is closed at a second end of the pipe; and
   said activating element in the form of a flexible membrane attached internally in the pipe, and which separates the pressure balancing channel from the suction channel;
   in which the valve is arranged to open to fluid outflow when the suction channel, via the first end of the pipe, is supplied an underpressure (P2) which is less than said ambient pressure (P1) by a predetermined value, whereby the membrane is exposed to a pressure difference (P1-P2) which activates and moves the membrane, thereby transmitting a valve-opening force to the sealing element, wherein the membrane, the sealing element and its valve seat have a lengthy shape and extend in the longitudinal direction of the pipe; and wherein the opposite long sides of the membrane are attached to the inside of the pipe and at a distance from each other;

wherein the lengthy sealing element is force-transmittingly connected to the lengthy membrane via a lengthy and axially extending first valve rib attached to the membrane and projecting outward therefrom; and wherein the lengthy valve seat communicates with the pipe via a lengthy and axially extending second valve rib attached to the inside of the pipe and projecting outward therefrom;

whereby an internal fluid outflow channel, which is open at the second end of the pipe, is defined between the membrane, the inside of the pipe and said two valve ribs.

2. A device for a dispensing valve in a pipe, the pipe being connected, when in its position of use, to a receptacle containing a fluid at a pressure (P3), in which the valve comprises:

an activating element;

a sealing element which is force-transmittingly connected to the activating element; and a valve seat against which the sealing element seals when the valve is inactive and in its position of rest;

in which the pipe at least is open in a first end and contains at least:

a separate pressure balancing channel communicating only with the ambient pressure (P1) of the pipe;

a suction channel communicating with the first end of the pipe and with the valve, and which is closed at a second end of the pipe; and said activating element in the form of a flexible membrane attached internally in the pipe, and which separates the pressure balancing channel from the suction channel;

in which the valve is arranged to open to fluid outflow when the suction channel, via the first end of the pipe, is supplied an underpressure (P2) which is less than said ambient pressure (P1) by a predetermined value, whereby the membrane is exposed to a pressure difference (P1-P2) which activates and moves the membrane, thereby transmitting a valve-opening force to the sealing element, wherein the membrane, the sealing element and its valve seat have a lengthy shape and extend in the longitudinal direction of the pipe; and wherein the opposite long sides of the membrane are attached to the inside of the pipe and at a distance from each other; and wherein the second end of the pipe is closed, whereby the suction channel also is closed at this end;

wherein the wall of the pipe is provided with an axially extending and through-going slit arranged vis-à-vis the suction channel, in which one slit surface of the slit constitutes the lengthy sealing element, whereas the other slit surface of the slit constitutes the lengthy valve seat; and wherein the sealing element and the lengthy membrane are force-transmittingly connected via an intermediate wall portion of the pipe;

whereby said two slit surfaces will move away from each other and open to fluid outflow when the suction channel is supplied said valve-opening underpressure (P2).

3. The device according to claim 2, wherein at least a longitudinal portion and a perimeter portion of the pipe are enclosed by an outer tubular mantle, said portions including said dispensing valve;

wherein a first end of the mantle is attached sealingly against the pipe in a region between the first end of the pipe and its dispensing valve, whereas a second end of the mantle is open;

whereby an external fluid outflow channel is defined between the pipe and the outer mantle.

4. The device according to claim 3, wherein the outer tubular mantle is comprised of a separate outer pipe.

5. The device according to claim 4, wherein the outer pipe is telescopically arranged, whereby the outer pipe is extensible and contractible in its longitudinal direction.

6. The device according to claim 3, wherein the outer tubular mantle is incorporated together with a longitudinal portion of the pipe containing the valve.

7. The device according to claim 3, wherein the second, open end of the mantle is shaped as a point, whereby the second end of the mantle may be readily inserted into said fluid receptacle.

8. The device according to claim 1, wherein the second end of the pipe is shaped as a point, whereby the pipe may be readily inserted into said fluid receptacle.

9. The device according to claim 1, wherein the pressure balancing channel is connected to at least one vent communicating with the ambient pressure (P1) of the pipe.

10. The device according to claim 4, wherein the second, open end of the mantle is shaped as a point, whereby the second end of the mantle may be readily inserted into said fluid receptacle.

11. The device according to claim 5, wherein the second, open end of the mantle is shaped as a point, whereby the second end of the mantle may be readily inserted into said fluid receptacle.

12. The device according to claim 6, wherein the second, open end of the mantle is shaped as a point, whereby the second end of the mantle may be readily inserted into said fluid receptacle.

13. The device according to claim 2, wherein the second end of the pipe is shaped as a point, whereby the pipe may be readily inserted into said fluid receptacle.

14. The device according to claim 2, wherein the pressure balancing channel is connected to at least one vent communicating with the ambient pressure (P1) of the pipe.

* * * * *